United States Patent [19]

Yoon

[11] Patent Number: 5,506,720
[45] Date of Patent: Apr. 9, 1996

[54] METHOD FOR MANUFACTURING AN ELECTRODISPLACIVE ACTUATED MIRROR ARRAY

[75] Inventor: Dong-Seon Yoon, Seoul, Rep. of Korea

[73] Assignee: Daewoo Electronics Co., Ltd., Seoul, Rep. of Korea

[21] Appl. No.: 312,745

[22] Filed: Sep. 27, 1994

[30] Foreign Application Priority Data

Sep. 28, 1993 [KR] Rep. of Korea ............... 1993-20260

[51] Int. Cl.$^6$ .................. G02B 5/08; G02B 26/00; H01L 41/04; H04R 17/00
[52] U.S. Cl. ............... 359/224; 359/291; 359/846; 359/855; 359/900; 310/328; 310/366; 29/25.35
[58] Field of Search .................... 359/224, 225, 359/246, 248, 291, 295, 323, 846, 849, 850, 855, 900; 310/328, 366; 29/25.35

[56] References Cited

U.S. PATENT DOCUMENTS

5,083,857  1/1992  Hornbeck .................. 359/224
5,085,497  2/1992  Um et al. .................. 359/855
5,159,225  10/1992  Um .................. 310/328
5,212,582  5/1993  Nelson .................. 359/224

*Primary Examiner*—Ricky D. Shafer
*Attorney, Agent, or Firm*—Anderson Kill Olick & Oshinsky

[57] ABSTRACT

An array of M×N electrodisplacive actuated mirrors for use in an optical projection system is assembled by way of: (a) preparing a ceramic wafer made of an electrodisplacive material, having a top and a bottom surfaces; (b) providing on the bottom surface of the ceramic wafer an array of M×N first electrodes; (c) forming a first metallization on the top surface thereof; (d) mask bonding; (e) forming an array of M×N actuating members by providing M trenches thereon using a sandblasting method; (f) mounting the ceramic wafer on an active matrix; (g) mask removing; (h) forming a second metallization; (i) providing a first photoresistive layer; (j) electroforming; (k) removing the first photoresistive layer; (l) providing a second photoresistive layer; (m) forming a platform with a flat top surface; (n) providing a light reflecting layer; (o) pattern the light reflecting layer, including the platform, into an array of M×N mirrors; and (p) removing the second photoresist layer to thereby form an array of M×N electrodisplacive actuated mirrors.

9 Claims, 13 Drawing Sheets

METHOD FOR MANUFACTURING AN ELECTRODISPLACIVE ACTUATED MIRROR ARRAY

FIELD OF THE INVENTION

The present invention relates to an optical projection system; and, more particularly, to an improved method for manufacturing an array of electrodisplacive actuated mirrors for use in an optical projection system.

BACKGROUND OF THE INVENTION

Among the various video display systems available in the art, an optical projection system is known to be capable of providing a high quality display in a large scale. In such an optical projection system, light from a lamp is uniformly illuminated onto an array of, e.g., M×N, actuated mirrors such that each of the mirrors is coupled with each of the actuators. The actuators may be made of an electrodisplacive material such as a piezoelectric or an electrostrictive material which deforms in response to an electric field applied thereto.

The reflected light beam from each of the mirrors is incident upon an aperture of a baffle. By applying an electrical signal to each of the actuators, the relative position of each of the mirrors to the incident light beam is altered, thereby causing a deviation in the optical path of the reflected beam from each of the mirrors. As the optical path of each of the reflected beams is varied, the amount of light reflected from each of the mirrors which passes through the aperture is changed, thereby modulating the intensity of the beam. The modulated beams through the aperture are transmitted onto a projection screen via an appropriate optical device such as a projection lens, to thereby display an image thereon.

In FIGS. 1A to 1F, there is illustrated a method for manufacturing an array 100 of M×N electrodisplacive actuated mirrors 50 for use in an optical projection system, disclosed in a copending, commonly owned application, U.S. Ser. No.08/278,472, entitled "ELECTRODISPLACIVE ACTUATED MIRROR ARRAY", the method comprising the steps of: (1) preparing a ceramic wafer 10, made of an electrodisplacive material, having a top and a bottom surfaces 1, 2; (2) forming an array 3 of M×N first electrodes 4 on the bottom surface 2 of the ceramic wafer 10; (3) covering the top surface 1 of the ceramic wafer 10 with a conductive metallic layer 5; (4) forming a photoresistive layer 6 on top of the metallic layer 5; (5) providing M vertically directional trenches 7 on the top surface 1 of the ceramic wafer 10 treated in accordance with the steps (2) to (4) using, for example, an etching process, each of the M trenches having a width of 50–70 μm and a depth of 50–100 μm; (6) forming on the top surface 1 of the ceramic wafer 10 treated in accordance with the steps (2) to (5) N–1 horizontally directional grooves thereon (not shown) using an etching process, thereby forming an array 17 of M×N electrodisplacive actuators 18; (7) removing the photoresistive layer 6; (8) mounting the ceramic wafer 10 treated in accordance with the steps (2) to (6) on an active matrix 8, comprising a substrate 9 and an array of M×N transistors (not shown); (9) placing an array of 11 M×N hinges 12 on the ceramic wafer 10 treated in accordance with the above-described steps, wherein each of the M×N hinges 12 is provided with a protrusion 15 for its fitting to each corresponding one of the M trenches 7; (10) forming a mirror 19 on the flat top surface 13 of each of the M×N hinges 12; and (11) making electrical connections to thereby form an array 100 of M×N electrodisplacive actuated mirrors 50.

Major drawback of the above-described method for manufacturing an array of M×N electrodisplacive actuated mirrors is that it involves a number of time consuming, hard to control, and tedious processes. One of such processes is the formation of the M vertically directional trenches, each having, as stated above, a width of 50–70 μm and a depth of 50–100 μm, respectively, and formed conventionally by utilizing an etching process or combinations thereof. It is, however, extremely difficult and also time consuming to form the M trenches precisely on the electrodisplacive material using such a procedure.

SUMMARY OF THE INVENTION

It is, therefore, a primary object of the present invention to provide an improved method for manufacturing an array of M×N electrodisplacive actuated mirrors which requires less manufacturing time, less tedious and is, at the same time, easy to control.

In accordance with one aspect of the present invention, there is provided a method for manufacturing an array of M×N electrodisplacive actuated mirrors for use in an optical projection system, comprising the steps of: (a) preparing a ceramic wafer made of an electrodisplacive material, having a top and a bottom surfaces; (b) providing on the entirety of the bottom surface of said ceramic wafer an array of M×N regularly spaced, identically sized first electrodes; (c) covering the top surface of said ceramic wafer with an electrically conductive first metallization having a top surface; (d) bonding M regularly spaced, vertically directional masks on the top surface of the first metallization, wherein each of the first electrodes on the bottom surface of said ceramic wafer, when projected to the top surface of said ceramic wafer, overlaps portions of two adjacent masks; (e) generating on said ceramic wafer treated in accordance with said steps (b) to (d) an array of M×N actuating members, each actuating member having a flat top and a pair of side surfaces, by forming M vertically directional trenches of a predetermined width and depth, wherein each of the M trenches is further provided with N–1 horizontally directional grooves of a fixed dimension; (f) mounting said ceramic wafer treated in accordance with said steps (b) to (e) on an active matrix, comprising a substrate, an array of M×N transistors and an array of M×N connecting terminals, by connecting each of the first electrodes with each corresponding one of the connecting terminals; (g) removing the masks to thereby expose the flat top surface of the first metallization on each of the actuating members; (h) covering the top surface of the first metallization and the pair of side surfaces on each of the actuating members, completely and partially, with a second metallization; (i) providing a first photoresist layer on top of the second metallization, except portions partially covering the pair of side surfaces on each of the actuating members; (j) carrying out electroforming at the portions of the second metallization partially covering the pair of side surfaces on each of the actuating members, thereby reducing the width of each of the M trenches; (k) removing the first photoresist layer on top of the second metallization on each of the actuating members; (l) providing a second photoresist layer on top of the second metallization on each of the actuating members; (m) forming on the entirety of the top surface of the ceramic wafer treated in accordance with said steps (b) to (l), including the M trenches, with an epoxy to thereby generate a platform with a flat top surface thereon; (n) providing a light reflecting layer on the flat top layer, containing the light surface of the platform, thereby forming a mirror layer; (o) patterning the mirror reflecting layer and the platform into an array of M×N mirrors; and (p) removing the second photoresist layer on top of the second metallization on each of the actuating members to thereby form the array of M×N electrodisplacive actuated mirrors.

BRIEF DESCRIPTION OF THE DRAWINGS

The above and other objects and features of the present invention will become apparent from the following description of preferred embodiments given in conjunction with the accompanying drawings, wherein:

FIGS. 2A to 2K represent schematic cross-sectional views illustrating the manufacturing steps in accordance with a preferred embodiment of the present invention.

DETAILED DESCRIPTION OF THE PREFERRED EMBODIMENTS

Figure 1A:
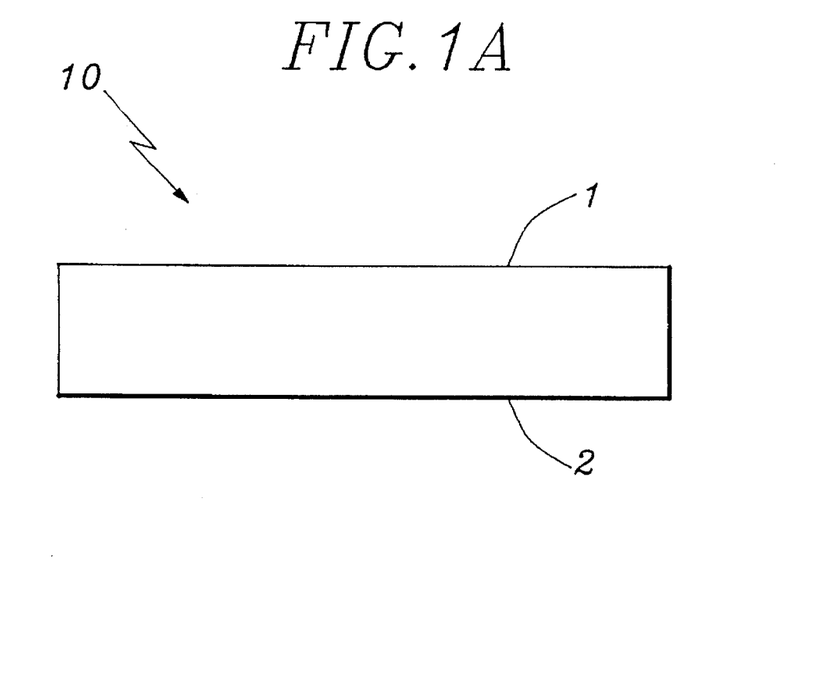
FIGS. 1A to 1F show schematic cross sectional views illustrating the previously disclosed manufacturing steps for an array of M×N electrodisplacive actuated mirrors.
Figure 1B:
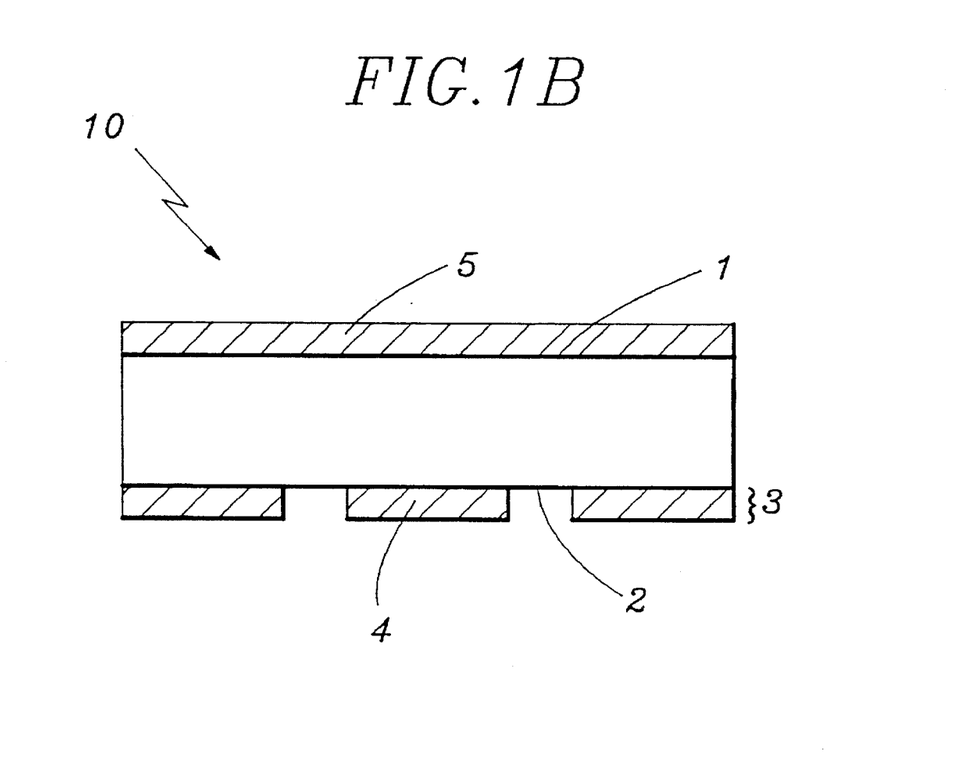
Figure 1C:
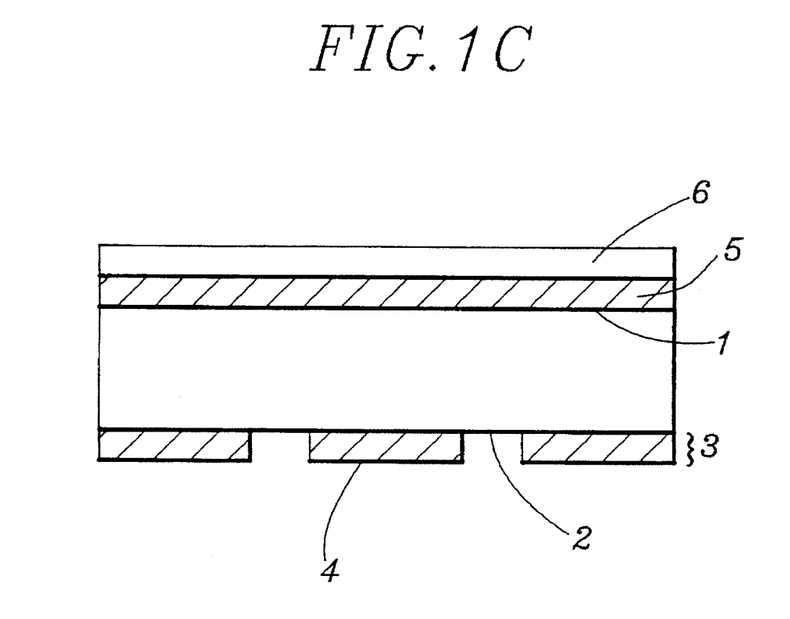
Figure 1D:
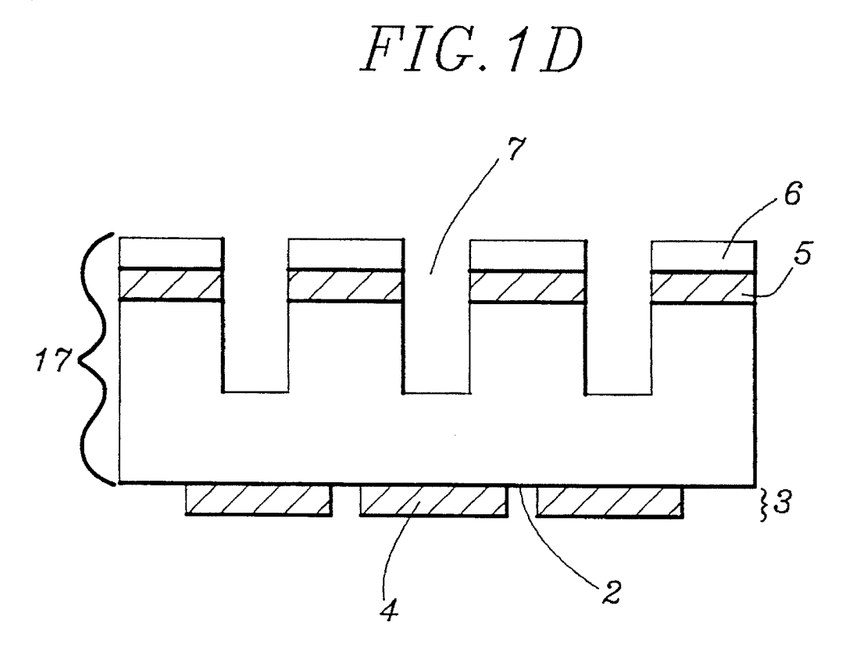
Figure 1E:
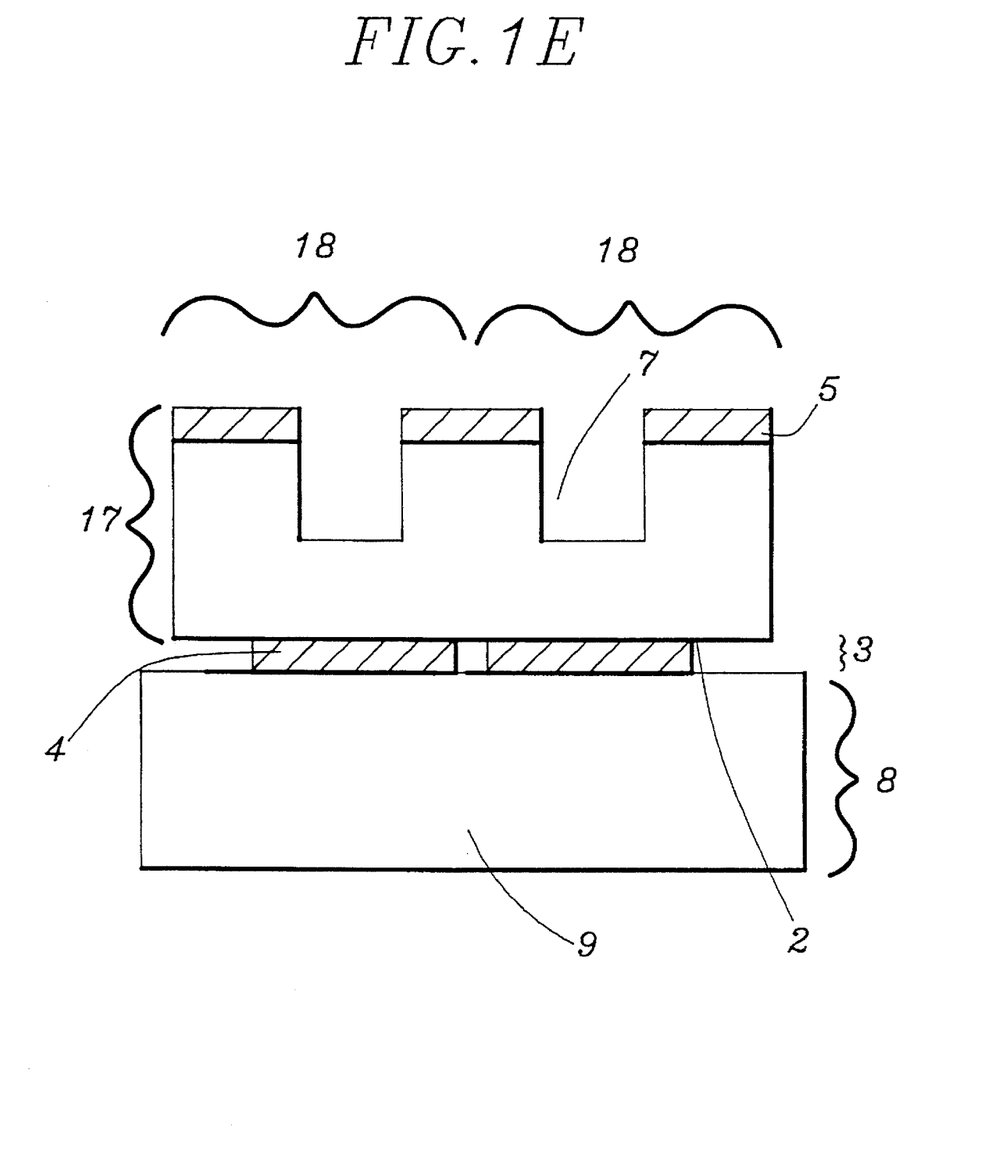
Figure 1F:
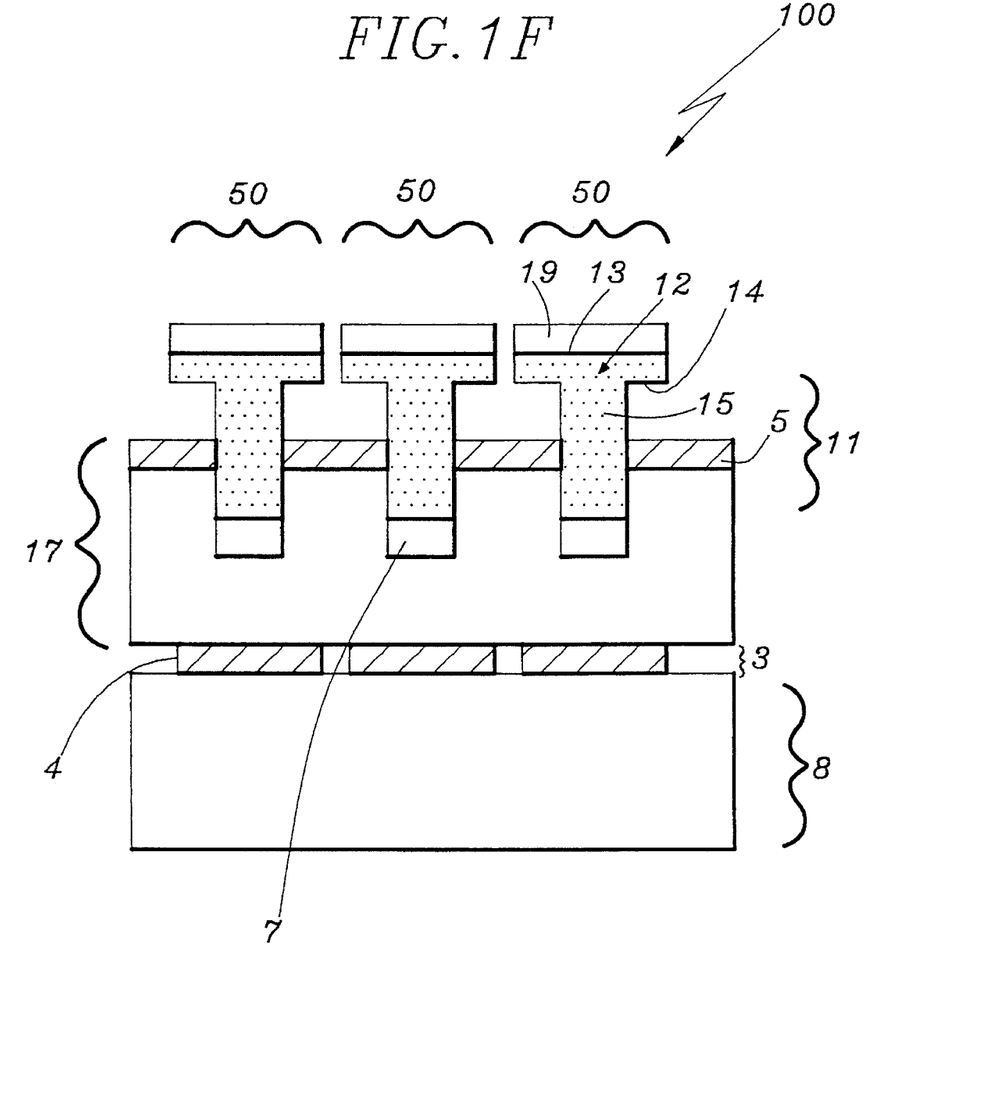
Figure 2A:
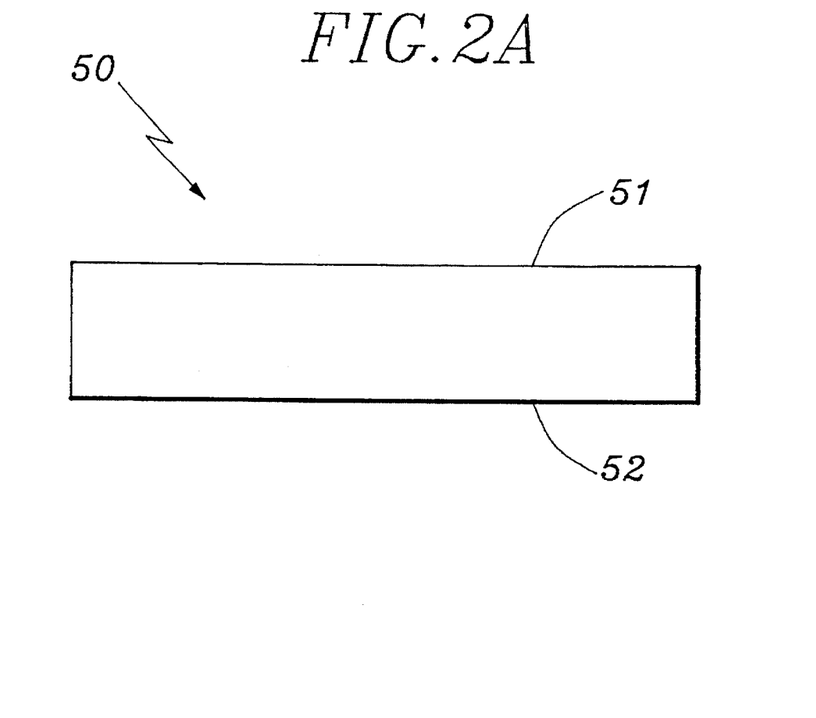

In accordance with the present invention, the process for manufacturing an array of M×N electrodisplacive actuated mirrors, wherein M and N are integers, begins with the preparation of a ceramic wafer 50, as shown in FIG. 2A, made of an electrodisplacive material such as a piezoelectric material, e.g., lead zirconium titanate(PZT) or an electrostrictive material, e.g., lead magnesium niobate-lead titanate(PMN-PT) and having a top and a bottom surfaces, 51, 52, wherein the top and the bottom surfaces, 51, 52, are flat and parallel to each other.

Figure 2B:
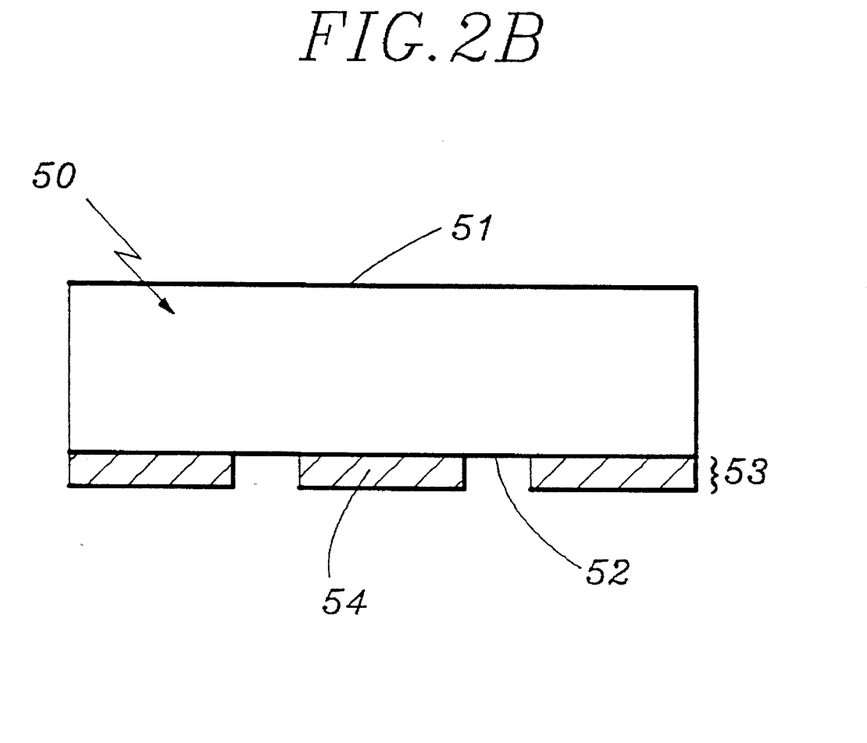

In the subsequent step, as shown in FIG. 2B, on the bottom surface 52 of the ceramic wafer 50, there is provided an array 53 of M×N regularly spaced, identically sized first electrodes 54, is formed by first sputtering the bottom surface 52 of the ceramic wafer 50 with an electrically conductive metal, e.g. copper (Cu), to obtain a layer thereof and then patterning the layer into the required electrode pattern using, e.g., a photolithography method.

Figure 2C:
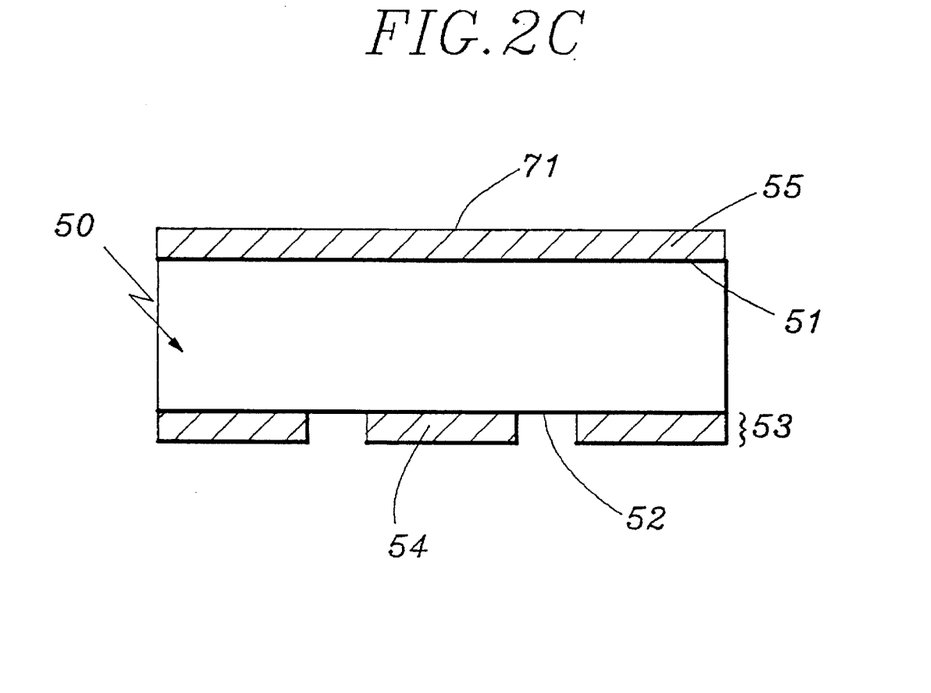

Thereafter, as shown in FIG. 2C, the top surface 51 of the ceramic wafer 50 is covered completely with an electrically conductive first metallization 55 having a top surface 71 by sputtering the top surface 51 thereof with an electrically conductive metal, e.g., Cu.

Figure 2D:
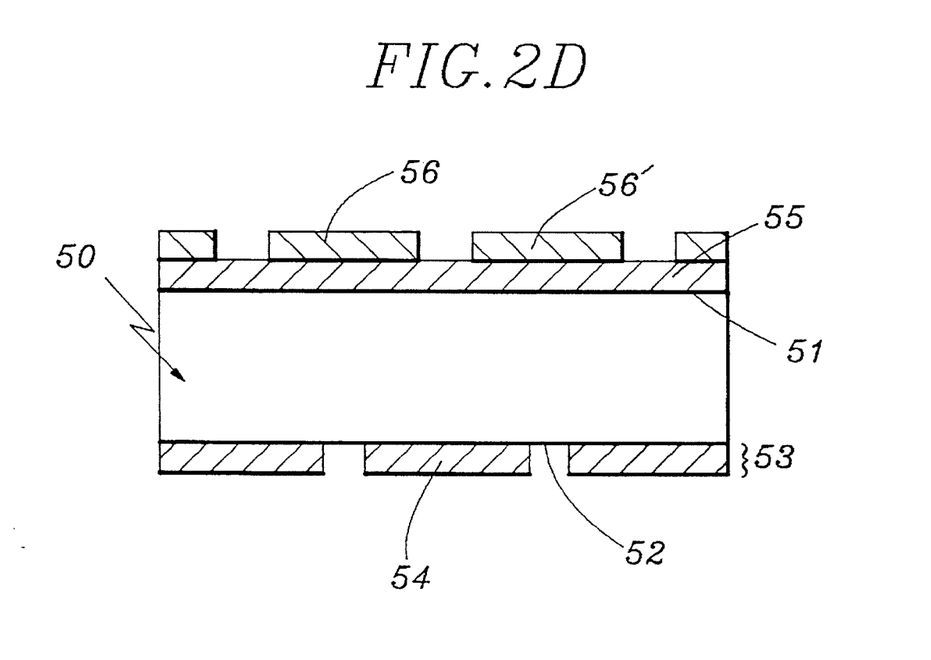

In the subsequent step, M regularly spaced, vertically directional masks 56 are bonded on the top surface 71 of the first metallization 55, wherein each of the first electrodes 54 on the bottom surface 52 of the ceramic wafer 50, when projected onto the top surface 51 thereof, overlaps portions of two adjacent masks 56,56', as schematically illustrated in FIG. 2D.

Figure 2E:
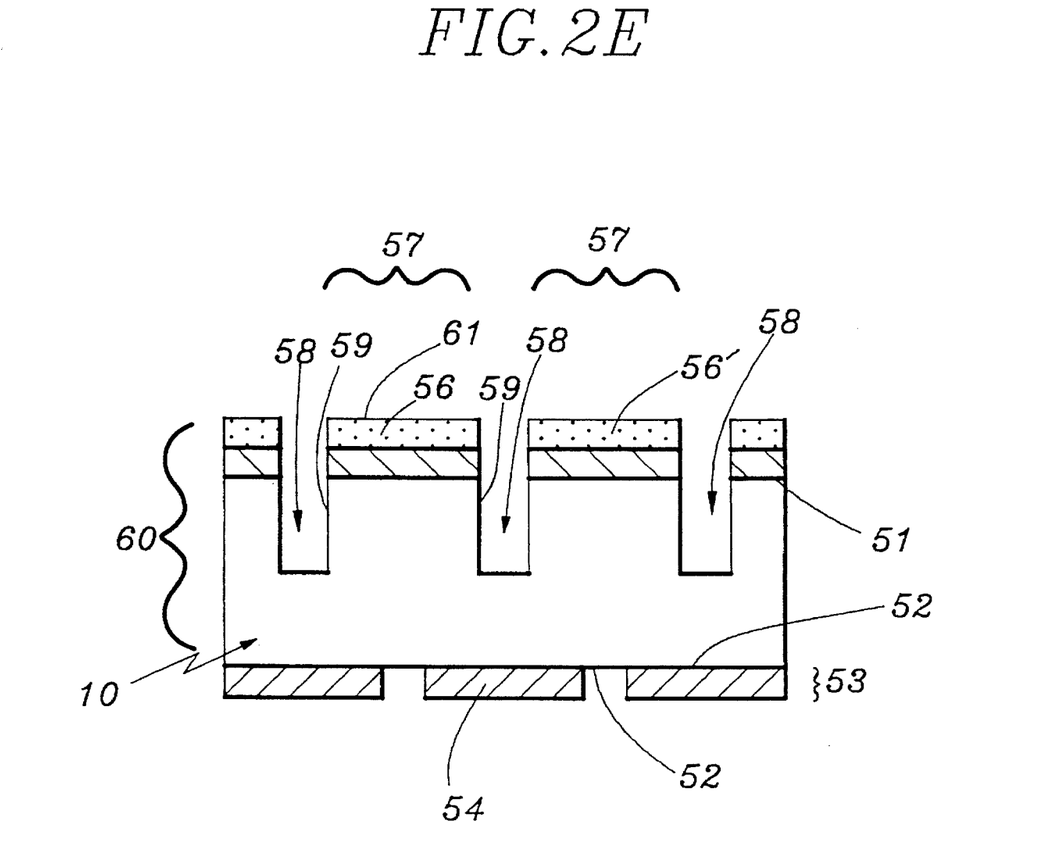

Thereafter, using a sandblasting or an equivalent method thereof, M vertically directional trenches 58 of a predetermined depth and width are formed at the portion of the top surface 71 of the first metallization 55 not covered by the M vertically directional masks 56, wherein each of the M trenches 58 is further provided with N−1 horizontally directional grooves (not shown) of a fixed dimension to thereby form an array 60 of M×N actuating members 57, each actuating member 57 having a flat top surface 61 and a pair of side surfaces 59, as illustrated in FIG. 2E. Since sandblasting involves the removal of the desired portions through the collision of the sandblasting powders with the portions to be removed, this process, in addition to being easy to control, is faster than the conventional chemical etching process.

Figure 2F:
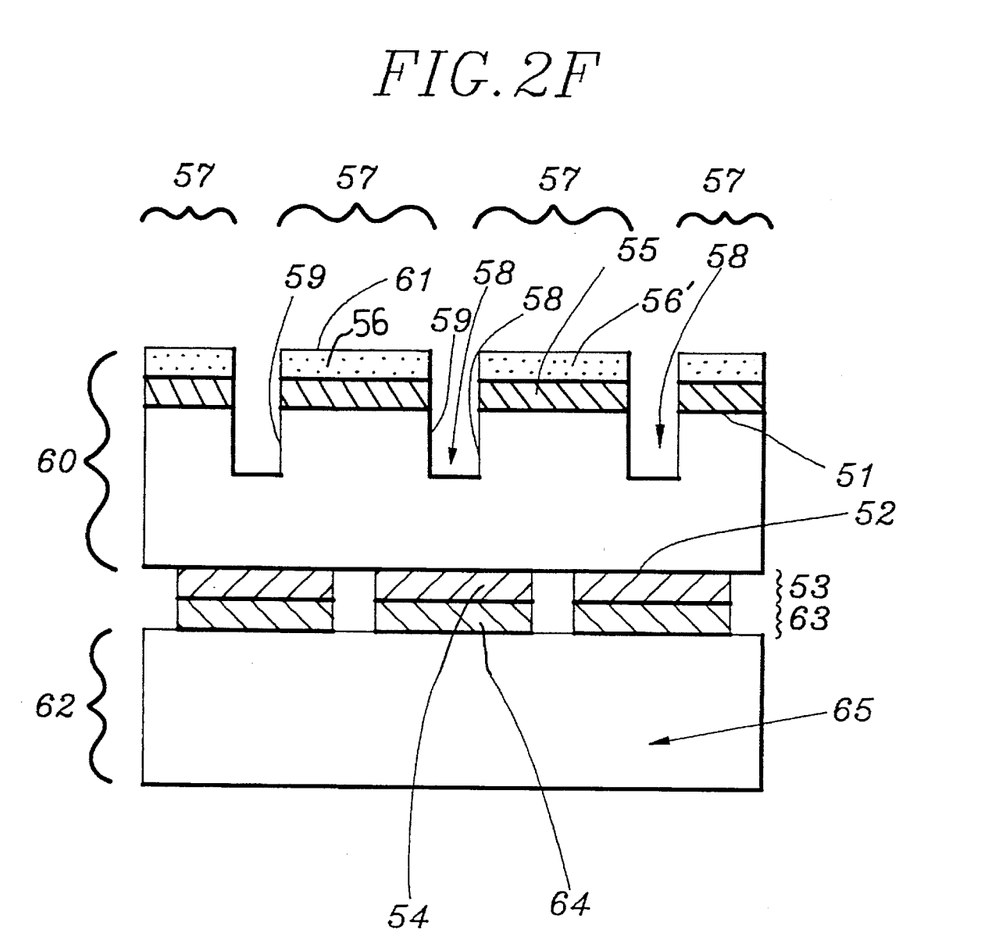

Subsequently, the ceramic wafer 50 treated in accordance with the above-described steps is mounted on an active matrix 62, comprising a substrate 65, an array of transistors (not shown) and an array 63 of M×N connecting terminals 64, by, connecting each of the first electrodes 54 with each corresponding one of the connecting terminals using an electrically conductive adhesive, as shown in FIG. 2F.

If the ceramic wafer 50 is made of a piezoelectric material, e.g., PZT, the ceramic wafer 50 must be poled prior to mounting thereof on the active matrix 62 in such a way that the polarization directions of the piezoelectric material in two horizontally neighboring actuating members are opposite from each other and those of two vertically neighboring actuating members are the same.

Figure 2G:
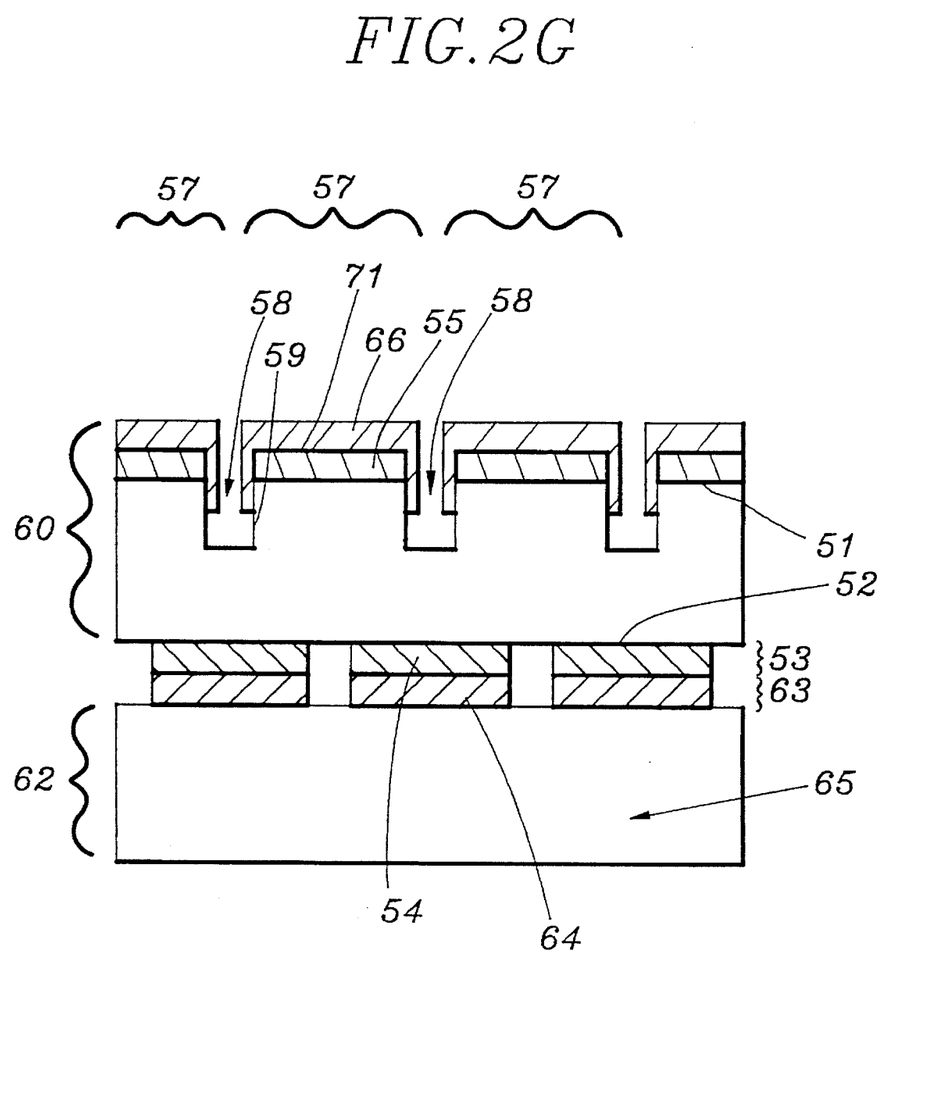

After removing the M vertically directional masks 56, thereby exposing the top surface 71 of the first metallization 55 on each of the actuating members 57, the top surface 71 and the pair of side surfaces 59 thereof are covered with a second metallization 66, as shown in FIG. 2G.

Figure 2H:
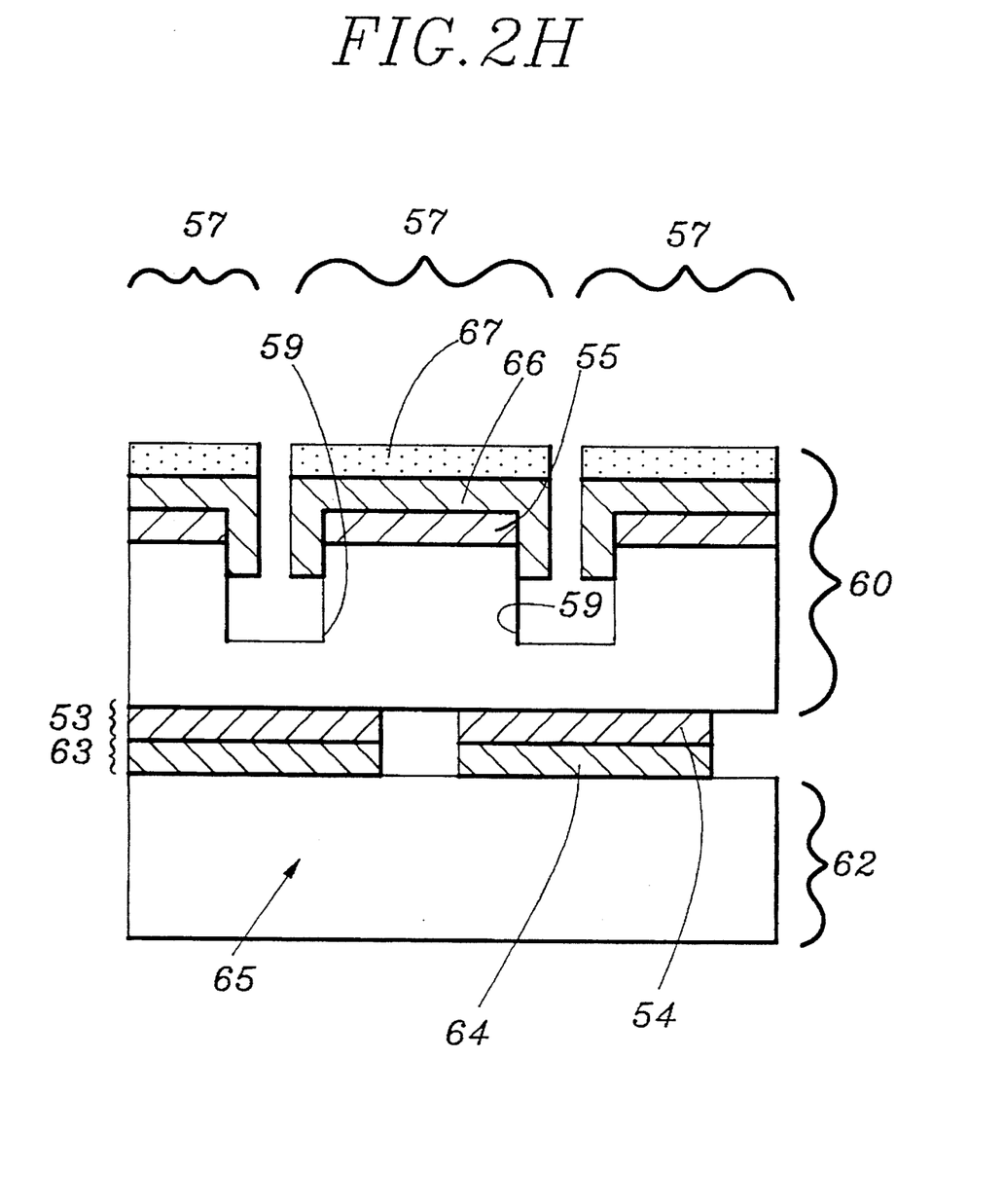

In the subsequent step, as illustrated in FIG. 2H, a first photoresist layer 67 is provided on top of the second metallization 66, except portions partially covering the pair of side surfaces 59 on each of the actuating members 57.

Thereafter, electroforming is carried out at the portions of the second metallization 66 partially covering the pair of side surfaces 59 on each of the actuating member 57, thereby reducing the width of each of the M trenches 58, and once the electroforming is completed, the first photoresist layer 67 is removed. This step is schematically illustrated in FIG. 2I.

Subsequently, a second photoresist layer 68 is formed on top of the second metallization 66 on each of the actuating members 57.

Figure 2J:
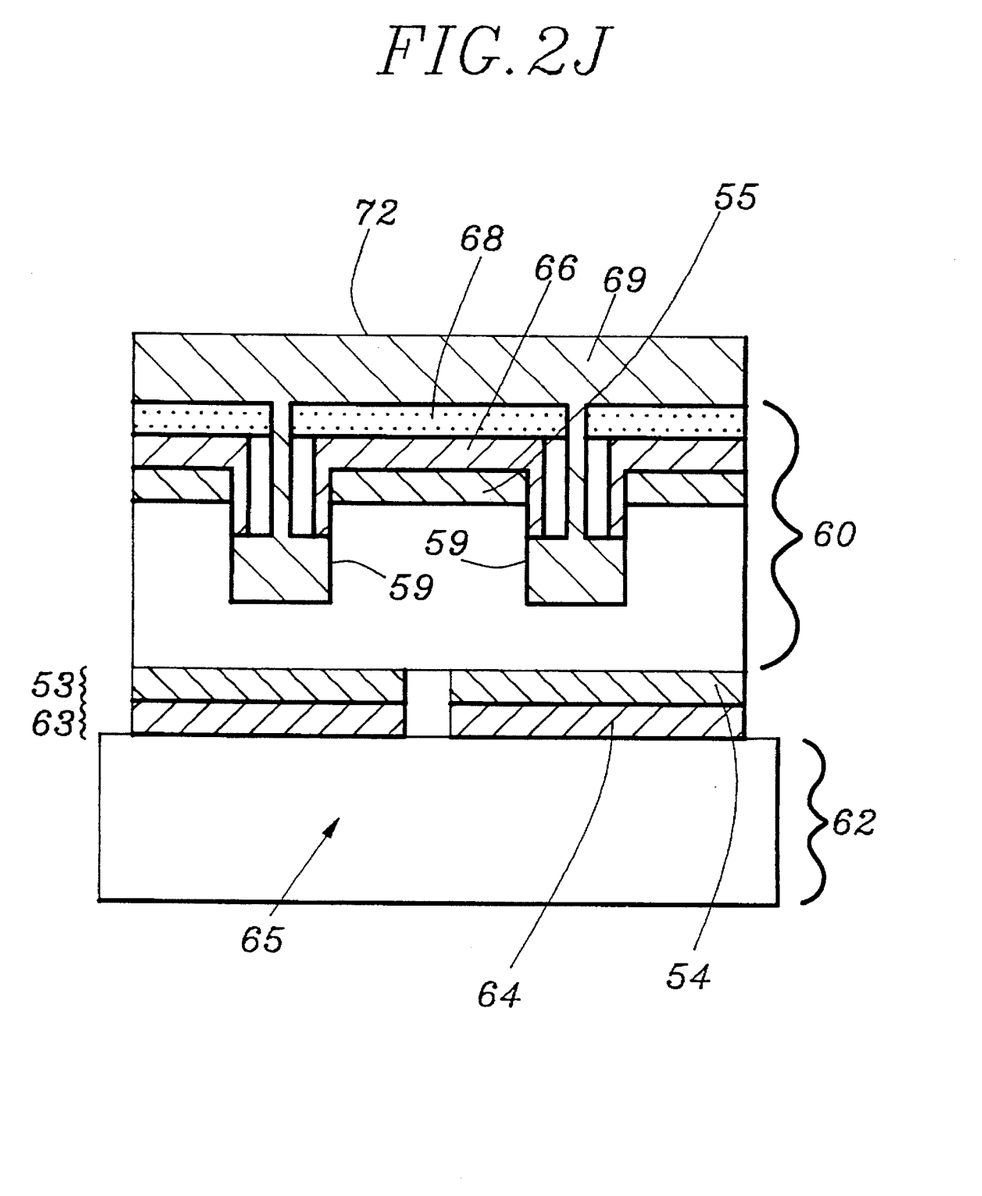

Following the formation of the second photoresist layer 68, a platform 69, made of an epoxy, with a flat top surface 72 is formed on the ceramic wafer treated in accordance with the above-described steps by completely covering the top surface, including the M trenches 58, with the epoxy, as shown in FIG. 2J. The epoxy is made of a material which solidifies under an UV light.

Thereafter, a light reflecting layer is formed on the flat top surface 72 of the platform 69 by sputtering thereon with a light material, e.g., Al, to thereby form a mirror layer, containing the light reflecting layer and the platform 69. The mirror layer is, then, patterned into an array 75 of M×N mirrors 76.

Figure 2K:
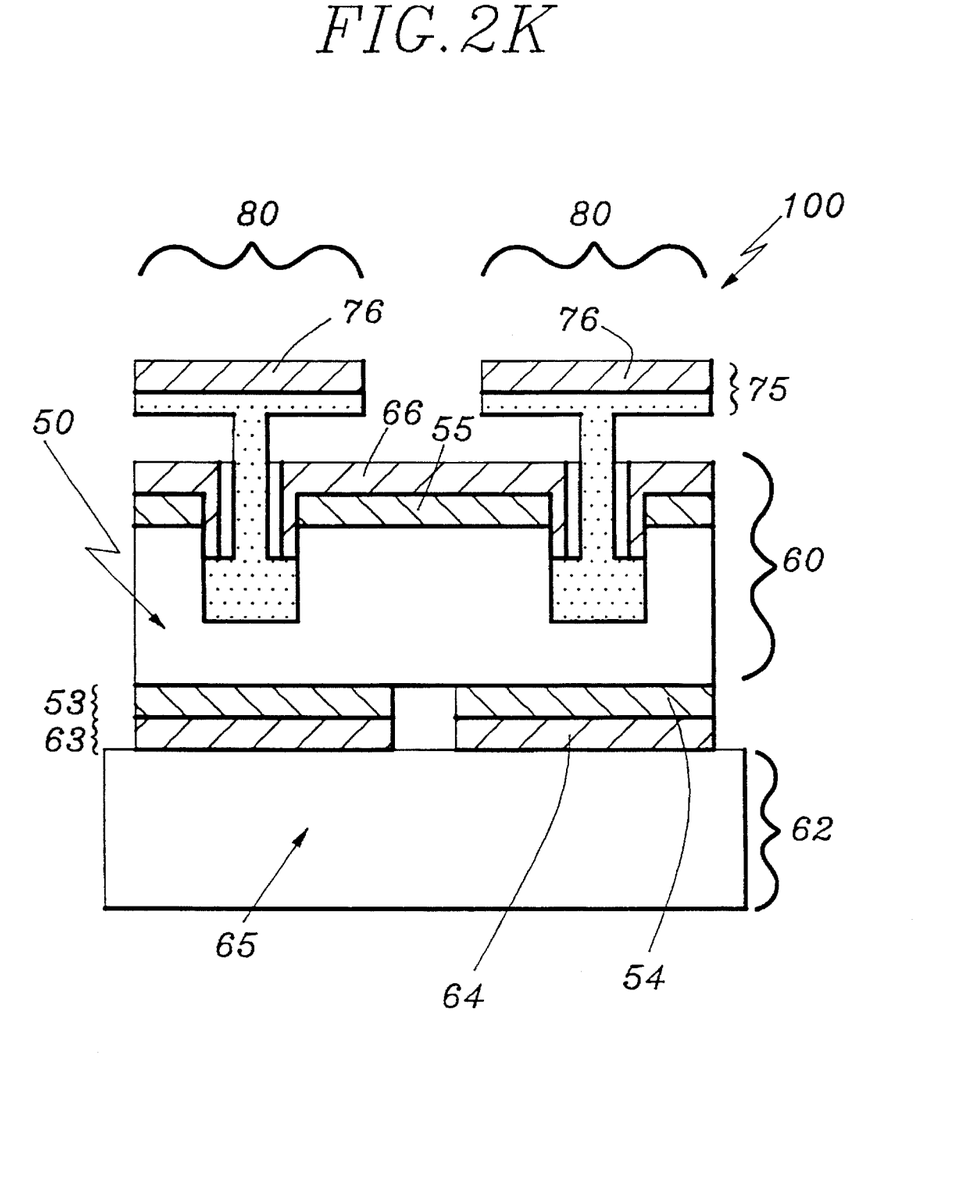

Subsequently, as illustrated in FIG. 2K, the second photoresit layer 68 on top of the second metallization 66 on each of the M×N actuating members 57 is removed to thereby form the array 100 of M×N electrodisplacive actuated mirrors 80.

While the present invention has been described with respect to certain preferred embodiments only, other modifications and variations may be made without departing from the scope of the present invention as set forth in the following claims.

What is claimed is:

1. A method for manufacturing an array of M×N electrodisplacive actuated mirrors for use in an optical projection system wherein M and N are integers, comprising the steps of:

(a) preparing a ceramic wafer made of an electrodisplacive material, having a top and a bottom surfaces;

(b) providing on the entirety of the bottom surface of said ceramic wafer an array of M×N regularly spaced, identically sized first electrodes;

(c) covering the top surface of said ceramic wafer with an electrically conductive first metallization having a top surface;

(d) bonding M regularly spaced, vertically directional masks on the top surface of the first metallization, wherein each of the first electrodes on the bottom surface of said ceramic wafer, when projected to the top surface of said ceramic wafer, overlaps portions of two adjacent masks;

(e) generating on said ceramic wafer treated in accordance with said steps (b) to (d) an array of M×N actuating members, each actuating member having a flat top and a pair of side surfaces, by forming M vertically directional trenches of a predetermined width and depth, wherein each of the M trenches is further provided with N−1 horizontally directional grooves of a fixed dimension;

(f) mounting said ceramic wafer treated in accordance with said steps (b) to (e) on an active matrix, having a substrate, an array of M×N transistors and an array of M×N connecting terminals, by connecting each of the first electrodes with each corresponding one of the connecting terminals;

(g) removing the masks to thereby expose the flat top surface of the first metallization on each of the actuating members;

(h) covering the top surface of the first metallization and the pair of side surfaces on each of the actuating members with a second metallization;

(i) providing a first photoresist layer on top of the second metallization, except portions partially covering the pair of the side surfaces on each of the actuating members;

(j) carrying out electroforming at the portions of the second metallization partially covering the pair of the side surfaces on each of the actuating memebers, thereby reducing the width of each of the M trenches;

(k) removing the first photoresist layer on top of the second metallization on each of the actuating members;

(l) providing a second photoresist layer on top of the second metallization on each of the actuating members;

(m) forming a platform with a flat top surface by covering with an epoxy the entirety of the top surface of the ceramic wafer treated in accordance with said steps (b) to (l), including the M trenches;

(n) providing a light reflecting layer on the flat top surface of the platform, thereby forming a mirror layer;

(o) patterning the mirror layer, containing the light reflecting layer and the platform, into an array of M×N mirrors; and (p) removing the second photoresist layer on top of the second metallization on each of the M×N actuating members to thereby form the array of M×N electrodisplacive actuated mirrors.

2. The method of claim 1, wherein said ceramic wafer is made of a piezoelectric material.

3. The method of claim 2, wherein said ceramic wafer is poled prior to mounting thereof on the active matrix.

4. The method of claim 3, wherein said ceramic wafer is poled in such a way that the polarization directions of the piezoelectric material in two horizontally neighboring actuating members are opposite from each other and those of two vertically neighboring actuating members are the same.

5. The method of claim 1, wherein the array of M×N first electrodes is formed by first sputtering the bottom surface of said ceramic wafer with an electrically conductive metal and then obtaining the required electrode pattern by using a photolithography method.

6. The method of claim 1, wherein the first conductive metallization is formed by sputtering the top surface of said ceramic wafer with an electrically conductive metal.

7. The method of claim 1, wherein the M trenches are formed by a sandblasting method.

8. The method of claim 1, wherein the epoxy is made of a material which solidifies under an UV light.

9. The method of claim 1, wherein the light reflecting layer is formed on the flat top surface of the platform by using a sputtering method.

* * * * *